United States Patent [19]

Hetherington

[11] Patent Number: 4,678,204
[45] Date of Patent: Jul. 7, 1987

[54] AUXILIARY SHOCK ABSORBER ASSEMBLY

[76] Inventor: Todd G. Hetherington, 1968 Church St., Costa Mesa, Calif. 92627

[21] Appl. No.: 885,272

[22] Filed: Jul. 14, 1986

[51] Int. Cl.$^4$ ............................................. B60G 11/26
[52] U.S. Cl. .................................. 280/710; 267/8 R; 280/697; 280/71; 280/DIG. 1
[58] Field of Search ............... 280/688, 697, 702, 709, 280/710, 718, DIG. 1; 267/8 R, 31, 151

[56] References Cited

U.S. PATENT DOCUMENTS

| | | | |
|---|---|---|---|
| 1,645,826 | 10/1927 | Stansbury | 267/31 |
| 1,647,009 | 10/1927 | Lovejoy | 267/31 |
| 1,729,627 | 10/1929 | O'Connor | 267/31 |
| 3,173,671 | 3/1965 | Broadwell | 280/DIG. 1 |
| 4,313,620 | 2/1982 | Posnikoff | 280/718 |

Primary Examiner—John J. Love
Assistant Examiner—Kenneth R. Rice
Attorney, Agent, or Firm—Lyon & Lyon

[57] ABSTRACT

An auxiliary shock absorber assembly for use on a vehicle in combination with the original equipment shock absorbers and vehicle suspension system including a conventional shock absorber of the type having a piston rod extending from end thereof and a built-in return for the piston rod, a shaft extension secured to the depending extended end of the piston rod, a stop member secured to the end of the shaft extension, a second stop member disposed between the shaft extension and the piston rod, and a mounting bracket adapted to be slidably disposed on the shaft extension between the stop members thereon and secured to the suspension system of the vehicle such that when traveling over conventional road conditions, shock absorption is provided solely by the original shock absorbers and the vehicle suspension system and, upon encountering an abrupt sliding along the shaft extension of the auxiliary shock absorber assembly with the movement of the vehicle suspension system and, upn encountering an abrupt irregularity in the roadway, the upward movement of the vehicle suspension system and mounting bracket assembly secured thereto causes the mounting bracket assembly to slide upwardly along the shaft extension tube and engage the upper stop member disposed thereon and force the piston rod into the cylinder of the auxiliary shock absorber thereby absorbing the additional shock of the vehicle's tire striking the irregularity in the roadway.

6 Claims, 3 Drawing Figures

ABSORBER ASSEMBLY

BACKGROUND OF THE INVENTION

The present invention relates to an auxiliary shock absorber assembly for use on a motor vehicle in combination with the original suspension system and shock absorbers or with modified shock absorbers to provide additional shock absorption when encountering rough terrain or potholes in the roadway without affecting the stiffness of the ride over normal road conditions.

When a motor vehicle equipped with conventional shock absorbers is driven off-road or otherwise encounters rough road conditions such as potholes, the impact force of the tire against the road or pothole causes the vehicle suspension system and the shock absorber on the impacting wheel to bottom out, resulting in a jarring impact on the vehicle frame, axle and suspension and possible damage thereto as well as jarring the vehicle's occupants. The use of stiffer shock absorbers not only provides stiffer and thus a less comfortable ride over normal road conditions, but is still generally ineffective in preventing a jarring of the vehicle due to the large forces generated by impacting abrupt irregularities in the roadway. A solution to the problem for off-road vehicles is to mount two conventional shock absorbers in tandem for each wheel. While such a mounting greatly increases the ability of the shock absorbers to absorb the shock of impact and thus greatly reduces the jarring to the vehicle and its passengers, the use of two shock absorbers in tandem for each wheel overly stiffens the ride for normal road conditions.

In view of the common use of vehicles over both smooth and rough terrain and the prevalence of potholes in city streets and the like, it would be highly desirable to provide a shock absorption assembly which was capable of greater energy dissipation for rough terrain use but which retained a relatively soft comfortable ride for normal city and highway driving conditions. It would also be desirable from both a cost and convenience standpoint to provide such an assembly which is compatible with existing vehicle suspension systems and did not need to be adjusted when encountering variations in roadway conditions. Such a shock absorber assembly is disclosed and claimed herein.

SUMMARY OF THE INVENTION

Briefly, the present invention comprises an auxiliary shock absorber assembly for each wheel adapted to be employed in combination with the original shock absorbers and suspension system provided with the vehicle. Each auxiliary shock absorber assembly comprises a conventional shock absorber of the type having a piston rod extending from one end thereof and a built-in return for the piston rod. The end of the shock absorber opposite the piston rod is secured to the vehicle frame. A shaft extension tube is secured to the depending piston rod and stops are provided at the lower end of the shaft extension and between the shaft extension and the piston rod. A mounting bracket is slidably mounted on the shaft extension tube between the stops and is secured to the vehicle suspension system such that when the vehicle travels over conventional road conditions, shock absorption is provided solely by the vehicle suspension system and the original shock absorbers with the mounting bracket of the auxiliary shock absorber assembly moving with the vehicle suspension system and sliding along the shaft extension between the stops mounted thereon. Upon encountering an abrupt irregularity in the roadway, the resulting upward movement of the vehicle suspension system is sufficient to cause the mounting bracket to abort the upper stop and drive the piston rod upwardly into the auxiliary shock absorber thereby providing greater shock absorption for the vehicle.

It is the principle object of the present invention to provide an auxiliary shock absorption assembly for a vehicle which increases the ability of the vehicle to absorb shock from irregularities in the roadway without affecting the stiffness of the ride over smooth terrain.

It is another object of the present invention to provide an auxiliary shock absorber assembly for a vehicle for use with the original vehicle shock absorbers and suspension system which increases the ability of the vehicle to absorb shock from irregularities in the roadway without affecting the quality of the ride over smooth terrain and without the need for adjustment when encountering variations in driving conditions.

It is yet another object of the present invention to provide an auxiliary shock absorber assembly for a vehicle which increases the ability of the vehicle to absorb shock from irregularities in the roadway without affecting the quality of the ride over smooth terrain which is of simple construction and economical to manufacture.

These and other objects and advantages of the present invention will become apparent from the following detailed description taken in conjunction with the accompanying drawings.

IN THE DRAWINGS

DESCRIPTION OF THE PREFERRED EMBODIMENT

Figure 1:
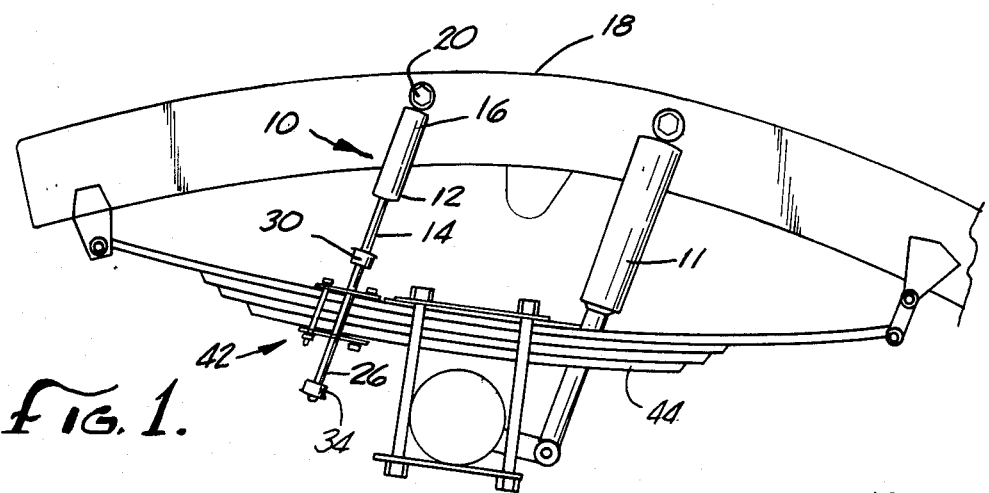
FIG. 1 is a side view of the auxiliary shock absorber assembly of the present invention in place on a vehicle.
Figure 2:
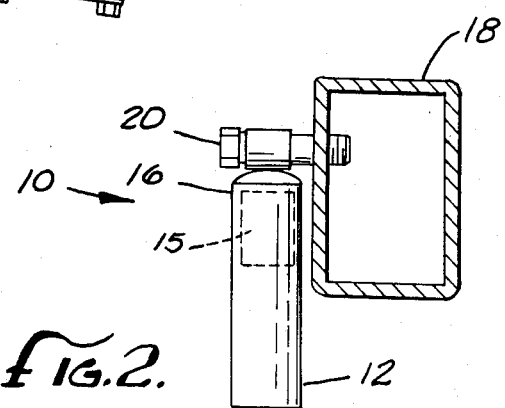
FIG. 2 is a side view of the auxiliary shock absorber assembly of the present invention.

The auxiliary shock absorber assembly 10 of the present invention is shown in FIG. 1 mounted forwardly of the original equipment shock absorber 11 and comprises a conventional shock absorber 12 of the type having a depending piston rod 14 and a built-in means 15 for biasing the piston rod outwardly from the shock absorber to provide an automatic return for the piston rod 14. While a gas-charged shock absorber such as a Monroe Model No. 5824 is well-suited for such use, shock absorbers employing spring biased piston rods could also be employed. Shock absorber 12 is mounted in an inverted position from normal use with the cylinder end 16 being secured to the vehicle frame 18 by a mounting bolt 20 and the piston rod 14 depending downwardly therefrom. The piston rod 14 is threaded at its extended end and defines a shoulder 24 spaced upwardly therefrom. A shaft extension tube 26 is threadably engaged with the end of the piston rod 14. A flat washer 28, a bell washer 29, and an enlarged stop member 30 constructed of a resilient rubber-like material are disposed between the upper end 32 of the extension tube 26 and the shoulder 24 on the piston rod 14 and held therebetween by the threaded engagement of the tube 26 and rod 14. A second lower resilient stop member 34 and washer 36, preferably bell-shaped, are secured to the lower end 38 of the shaft extension tube 26 by a bolt member 40 threadably engaged in the lower end 38 of the tube 26.

Figure 3:
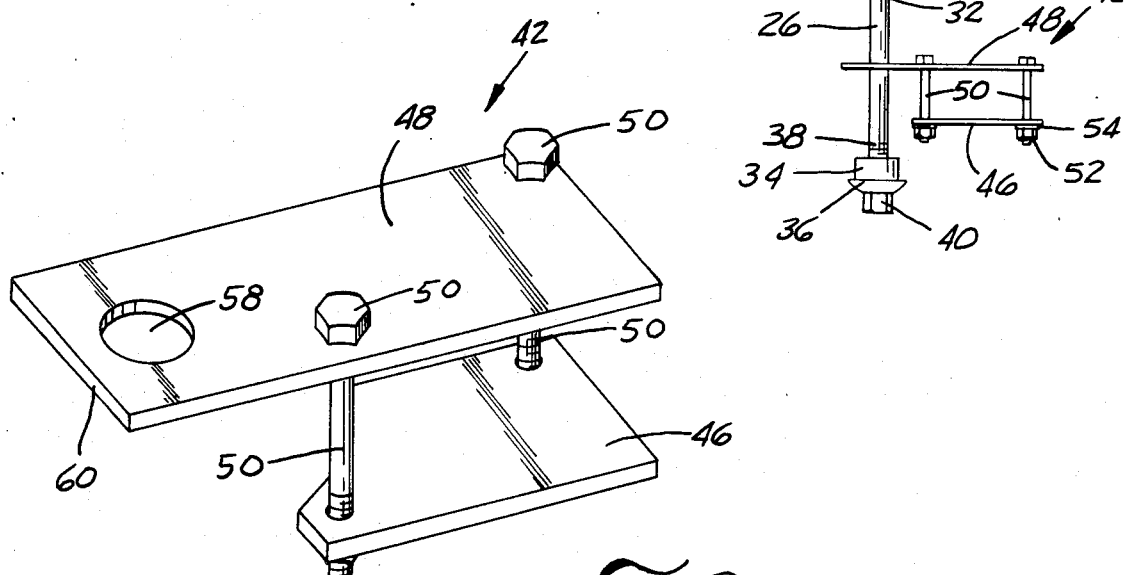
FIG. 3 is a perspective view of the mounting bracket of the auxiliary shock absorber assembly of the present invention used for securement to a leaf spring suspension system.

A mounting bracket assembly 42 is provided for securing the extension tube 26 to the vehicle suspension system. The precise configuration of the mounting bracket 42 necessarily depends on the type of suspension system provided with the vehicle, i.e., leaf spring, I-beam, A-frame, etc. The mounting bracket 42 shown in the drawings is specifically designed for sliding securement of the auxiliary shock absorber assembly 10 to a conventional leaf spring suspension system 44. As seen in FIG. 3, the mounting bracket assembly 42 is comprised of a lower plate 46, elongated upper plate 48 and bolt members 50 which extend through diagonally disposed apertures 52 in plates 46 and 48 with nuts 52 and lock washers 56, secure the plates in place about the leaf springs 44. An enlarged aperture 58 is provided adjacent the extended end 60 of the upper plate 48. The shaft extension tube 26 extends through aperture 58 and is slidable therein between stop members 30 and 34. The apertures 52 in plates 46 and 48 which are adapted to receive bolt members 50 are preferably diagonally disposed across plates 46 and 48 to provide sufficient clearance for the leaf springs 44 and the shaft extension tube 26 extending through aperture 58 in plate 48.

Various other aperture and bolt configurations could be employed as long as the aforesaid clearance is maintained. Further, as noted above, variations in the configuration of the bracket assembly would be dictated by the use of the auxiliary shock absorber assembly 10 with different vehicle suspension systems. For example, if an I-beam suspension system was provided on the vehicles, plates 46 and 48 would preferably be shaped to conform with the I-beam configuration so as to wrap around the I-beam suspension and provide better securement for the auxiliary shock absorber assembly 10. Other types of vehicle suspensions would require further modification of the bracket mounting assembly such that the assembly could be securely fastened to the vehicle suspension while allowing for sliding movement therethrough of the shaft extension tube 26.

In use, as the vehicle travels over relatively smooth terrain such as a highway or a city street, the road shock is absorbed by the original equipment shock absorbers (not shown) which are still in place and the vehicle suspension system, here leaf springs 44. As the leaf springs move upwardly and downwardly in response to variations in the roadway surface, the mounting bracket assembly 42 secured thereto moves accordingly and slides along the shaft extension tube 26. Upon encountering a pothole or other abrupt irregularity in the roadway, the leaf springs are driven upwardly with sufficient force that but for the auxiliary shock absorber assembly 10 of the present invention, the vehicle suspension system and the shock absorber on the impacting wheel would bottom out, jarring the vehicle and its occupants. However, with the auxiliary shock absorber assembly 10 in place, the upward travel of the suspension system and mounting bracket assembly 42 secured thereto causes the mounting bracket to abut the upper stop member 30 disposed between the shaft extension tube 26 and piston rod 14 and urge the piston rod into the cylinder of the inverted shock absorber 12, thereby absorbing the additional energy created by the impact of the vehicle tire abutting the irregularity in the roadway and preventing a jar to the vehicle and its occupants.

It can be seen that the additional shock absorbtion provided by assembly 10 is only provided when the force created by the vehicle tire or tires impacting or otherwise traveling over irregularities in the roadway is to cause the vehicle suspension system to displace the mounting bracket assembly 42 a sufficient distance to abort the stop member 30 carried by the pistom rod 14. When the force created by the vehicle ten passing over irregularities in the roadway is not great enough to displace the vehicle suspension and mounts bracket 42 secured there such a distance, the auxiliary chock absorber assembly 10 does not come into play and ride is unaffected by its presence on the vehicle.

Various changes and modifications could be made in the configuration of the mounting bracket assembly, the securement of stops 30 and 34 to the piston rod 14 and other elements of the present invention without departing from the spirit and scope thereof. Insofar as these changes are within the purview of the appended claims, they are to be considered as part of the present invention.

I claim:

1. An auxiliary shock absorber assembly adapted to be secured to the frame of a vehicle and to the vehicle suspension system for providing additional shock absorption in the event of the vehicle impacting an irregularity in the roadway, said assembly comprising a shock absorber having a piston rod extending from one end thereof and including means disposed therein for biasing said piston rod outwardly therefrom; means carried by said shock absorber for securing said shock absorber to the frame of the vehicle such that said piston rod extends downwardly therefrom, a first stop member carried by to said piston rod adjacent the end thereof, a second stop member carried by said piston rod and spaced from said first stop member; and a bracket assembly defining means for securing said bracket assembly to the vehicle suspension system and means for slidably receiving the portion of said piston rod disposed between said stop members thereon such that upon securing said shock absorber to the frame of the vehicle and said bracket to the vehicle suspension system with said piston rod being slideably through said bracket assembly between said stop members, sufficient upward movement of the vehicle suspension system in response to the vehicle impacting an irregularity in the roadway causes said bracket assembly to abut said second stop member and urge said piston rod into said shock absorber thereby providing additional shock absorbtion for the vehicle.

2. The combination of claim 1 wherein said shock absorber is of the gas charging type.

3. The combination of claim 1 wherein said bracket assembly comprises an upper plate, a lower plate, means for securing said upper and lower plates about and to the vehicle suspension system and an aperture in at least one of said plates for slideably receiving said portion of said piston rod.

4. An auxiliary shock absorber assembly adapted to be secured to the frame of a vehicle and to the vehicle suspension system for providing additional shock absorption in the event of the vehicle impacting an irregularity in the roadway, said assembly comprising: a shock absorber having a piston rod extending from one end thereof, means disposed at the other end thereof for securement of said shock absorber to the frame of the vehicle such that said piston rod extends downwardly therefrom and means disposed within said shock absorber for biasing said piston rod outwardly therefrom; an extension member adapted to be axially secured to said piston rod and extend therefrom; a first stop member adapted to be secured to the end of said extension member, a second stop member adapted to be disposed between said piston rod and said extension member in axial alignment with said first stop member; and a bracket assembly adapted to be rigidly secured to the vehicle suspension system and having an aperture extending therethrough adapted to receive said extension member such that said bracket assembly is slidable along said extension member between said first and second stop members such that upon securing said shock absorber to the frame of the vehicle and said bracket to the vehicle suspension system with said extension member extending through said aperture in said bracket assembly between said stop members, sufficient upward movement of the vehicle suspension system in response to the vehicle impacting an irregularity in the roadway causes said bracket assembly to abut said second stop member and urge said piston rod into said shock absorber thereby providing additional shock absorbtion for the vehicle.

5. The combination of claim 4 wherein said shock absorber is of the gas charging type.

6. The combination of claim 4 wherein said bracket assembly comprises an upper plate, a lower plate, means for securing said upper and lower plates about and to the vehicle suspension system and wherein said aperture is disposed in said upper plate.

* * * * *